United States Patent
Schafer et al.

(10) Patent No.: US 7,408,166 B2
(45) Date of Patent: Aug. 5, 2008

(54) X-RAY EXAMINATION APPARATUS AND RADIATION DETECTOR

(75) Inventors: Dirk Schafer, Hamburg (DE); Georg Rose, Dusseldorf (DE); Jens Wiegert, Aachen (DE); Michael Overdick, Langerwehe (DE); Walter Rutten, Linnich (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 11/568,271

(22) PCT Filed: Apr. 25, 2005

(86) PCT No.: PCT/IB2005/051342

§ 371 (c)(1),
(2), (4) Date: Oct. 25, 2006

(87) PCT Pub. No.: WO2005/107242

PCT Pub. Date: Nov. 10, 2005

(65) Prior Publication Data

US 2007/0272871 A1    Nov. 29, 2007

(30) Foreign Application Priority Data

Apr. 30, 2004    (EP)    ................................. 04101866

(51) Int. Cl.
*G01J 1/24*    (2006.01)

(52) U.S. Cl. ............................................... 250/370.09

(58) Field of Classification Search ..............................
250/370.01–370.15
See application file for complete search history.

(56) References Cited

U.S. PATENT DOCUMENTS

| 4,980,546 A | | 12/1990 | Berger |
| 5,274,224 A | * | 12/1993 | Poujois .................... 250/208.1 |
| 6,101,236 A | * | 8/2000 | Wang et al. .................... 378/4 |
| 6,208,708 B1 | * | 3/2001 | Hoheisel et al. ................ 378/37 |
| 6,424,750 B1 | | 7/2002 | Colbeth et al. |
| 6,462,723 B1 | | 10/2002 | Yamazaki et al. |
| 2003/0112350 A1 | * | 6/2003 | Suzuki et al. ................ 348/301 |

FOREIGN PATENT DOCUMENTS

| DE | 19945018 A1 | 4/2001 |
| EP | 0796000 A2 | 9/1997 |
| WO | 2003093869 A1 | 11/2003 |

OTHER PUBLICATIONS

ISR: PCT/IB05/051342.
Written Opinion: PCT/IB05/051342.

* cited by examiner

*Primary Examiner*—David P. Porta
*Assistant Examiner*—Kiho Kim

(57) ABSTRACT

The invention relates to an X-ray detector (1) with an array (2) of sensor elements (21), wherein each row (i) of sensor elements is connected via an addressing line to an addressing unit (5), and wherein each column j) of sensor elements is connected via a read-out line to a read-out unit (3). In the read-out unit (3), sensor signals are preprocessed, for example amplified by amplifiers (31). The detector further comprises a control unit (6) which is adapted to set the gains of said amplifiers (31) for each column (j) and each row (i) individually. The values of the gains may particularly be derived from a priori knowledge, from previous images of the object, or from the image signals of rows that have already been read out.

19 Claims, 1 Drawing Sheet

X-RAY EXAMINATION APPARATUS AND RADIATION DETECTOR

Figure 1:
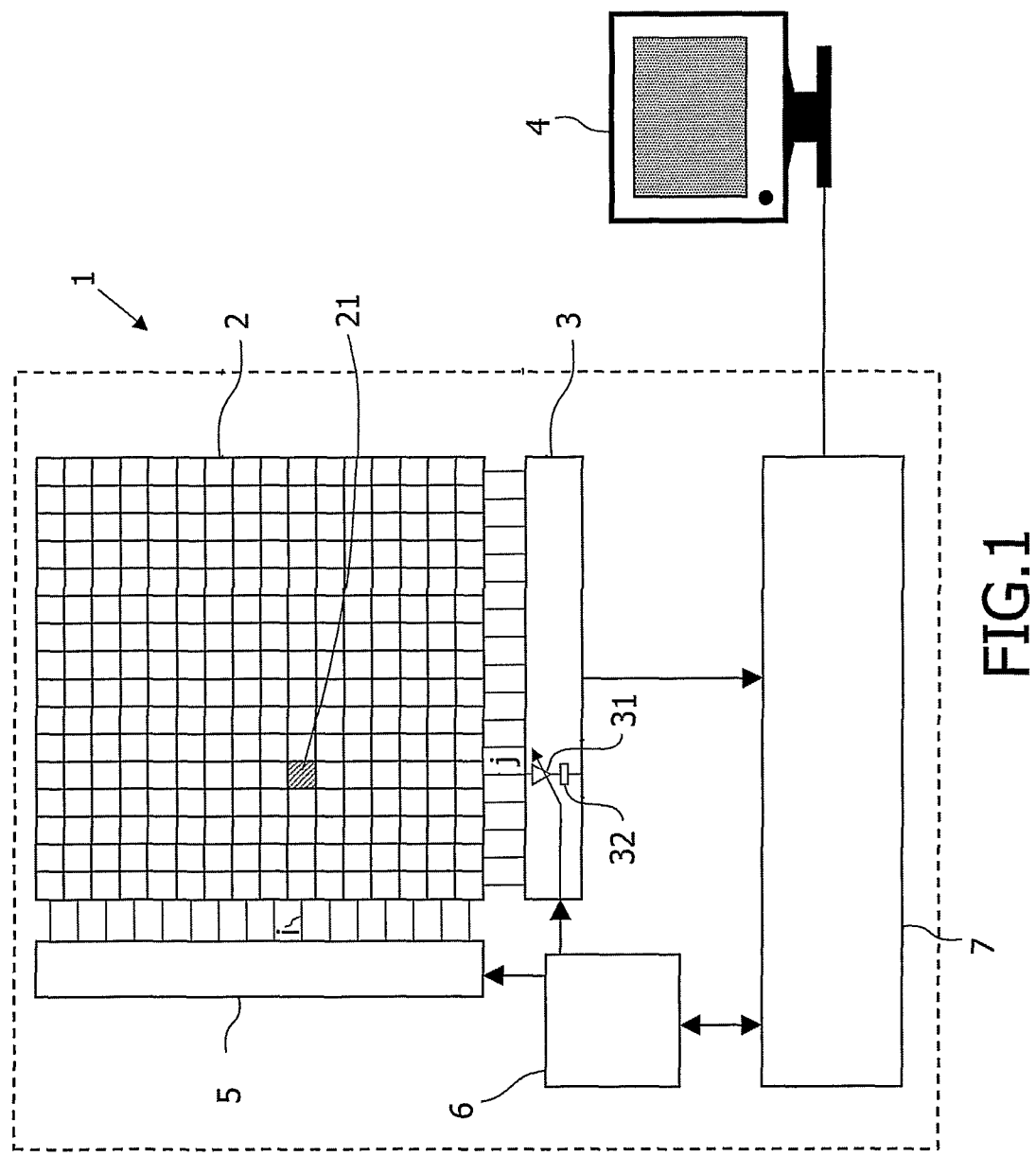

The invention relates to a radiation detector, especially an X-ray detector, with an array of sensor elements that are addressed and read out in subgroups. Moreover, it relates to a method for generating an image with such a radiation detector and an X-ray examination apparatus comprising such a radiation detector.

From the EP 0 796 000 A2 a radiation detector is known with sensor elements that are arranged in rows and columns of a matrix array. The sensor elements can be addressed row by row via an addressing unit, and they are connected column by column to read-out unit next to the array. For reading out the image signals of all sensor elements of the array, one row after the other is addressed by the addressing unit and each sensor element of an addressed row sends it signals to the read-out unit via one of a set of lines that run along the columns. The signals are then preprocessed in the read-out unit, for example by amplification and analog-to-digital conversion. In some embodiments described in the EP 0 796 000 A2, the gain with which the signals of one row are amplified can be changed externally for all sensor elements of one row in the same way. In known applications of this and similar systems, the gain of the amplifiers in the read-out unit may be changed from image to image that is generated with the detector. In these cases, the gain that is chosen for the preprocessing of an image is always a compromise between the preprocessing requirements of different regions of said image.

Based on this situation it was an object of the present invention to provide means for a better control of the preprocessing of images that are generated with a radiation detector.

This object is achieved by a radiation detector according to claim 1, an X-ray examination apparatus according to claim 9, and a method according to claim 10. Preferred embodiments are disclosed in the dependent claims.

A radiation detector according to the present invention functionally comprises the following components:

An array of sensor elements, the sensor elements being sensitive for radiation like visible light or X-rays. The sensor elements may for example be realized in amorphous or monocrystalline silicon. For generating an image, the sensor elements are exposed to radiation and then generate an (electrical) signal that is proportional to the amount of radiation they receive. The signal of each sensor element corresponds to a pixel of the image that is produced by the detector.

An addressing unit for selectively addressing subgroups of the sensor elements of the array. In a typical example, the sensor elements of the array are organized in a matrix of rows and columns, wherein each row constitutes a subgroup of sensor elements that can be addressed simultaneously by the addressing unit.

A read-out arrangement for preprocessing and reading out the signals of sensor elements that have been addressed by the addressing unit. As the addressing unit always addresses a whole subgroup of sensor elements, the read-out arrangement must accordingly be adapted to process the signals of all sensor elements of a subgroup at the same time. In the typical matrix arrangement mentioned above, the sensor elements are connected column by column to a read-out unit such that each sensor element of a row can be individually read out.

A control unit that is connected to the addressing unit and the read-out arrangement mentioned above, wherein the control unit is adapted to set preprocessing parameters individually for all sensor elements of a subgroup each time such a subgroup is addressed by the addressing unit. The determination of the preprocessing parameters is based on information that does not depend on the actual irradiation of the sensor elements that shall be preprocessed, particularly not on the dose of radiation these sensor elements or an environment thereof have received. Examples of preferred ways to determine the preprocessing parameters will be given below in connection with the description of special embodiments of the invention.

A radiation detector of the kind described above allows a very versatile and flexible management of the image signals produced by the sensor elements, because each sensor element in each subgroup that is read out in one step can be preprocessed with individual preprocessing parameters. Therefore, different regions of an image can be preprocessed and read out with locally optimized parameters.

According to a preferred embodiment, the read-out arrangement comprises amplifiers for amplifying the signals of the sensor elements, wherein the gain of said amplifiers can be set by the control unit. The amplification of signals produced by the sensor elements is an important preprocessing step, as the original signals of the sensor elements usually are very weak and therefore must be amplified before they can be passed on to external circuits for further processing. On the other hand, amplifiers typically have a certain operating range which can only be optimally exploited if the gain of the amplifiers fits to the strength of the signals that shall be processed. With a radiation detector according to the present invention, the gains of the amplifiers can be chosen such that they fit quite well to the actual signals, and thus the operating range of the amplifiers can be optimally used.

According to another embodiment of the invention, the sensor elements of the array are organized in rows and columns, for example by being arranged in a regular (rectangular or hexagonal) grid. Moreover, the rows of such an arrangement constitute the subgroups that can be addressed by the addressing unit, and the sensor elements of each column are connected via the same line to the read-out arrangement which is typically disposed adjacent to the array of sensor elements. As described above, the read-out arrangement may particularly comprise amplifiers for amplifying the sensor signals. Those amplifiers may be provided in the read-out arrangement for each column of the array, or, alternatively, each sensor element of the array may comprise an amplifier of its own that is disposed next to the sensor element in the array.

The radiation detector may optionally comprise a memory, for example a volatile or nonvolatile electronic data storage. The memory contains information that is related to the image which is currently being generated by the radiation detector, and the control unit is adapted to make use of said information for determining the preprocessing parameters of the read-out arrangement. The preprocessing of individual sensor signals can therefore be executed taking into consideration aspects of the image of the whole detector array.

The information on which the determination of the preprocessing parameters is based may comprise a priori knowledge about the object that is currently imaged by the detector. If for example an X-ray image of a leg is generated, the a priori knowledge may comprise the information that the object extends longitudinally across the image with stripes of direct radiation on the left and right side. The read-out arrangement may then be controlled in such a way that said left and right stripes are suppressed and that the central longitudinal region of the image is represented with most accuracy.

According to a further embodiment of the radiation detector, said information comprises a previous image of the object that is currently imaged by the detector. The previous image may have been generated quite a long time, for example days or weeks, before the image under consideration. Preferably, however, the previous image has been generated only shortly before the present image, such that the object has not or only minimally moved. The position of the object in the previous image and the present image is then approximately identical, such that pixel values of the previous image may be taken as a prediction of the sensor signals in the present image. The preprocessing parameters of the read-out arrangement may then be adapted according to these predicted values, thus yielding an image which is produced with locally optimized parameters.

According to another embodiment, the information on which the determination of the preprocessing parameters is based relates to the signals from sensor elements that belong to the currently generated image and that have already been read out. In a matrix arrangement of the sensor elements, the sensor signals of the previously read out row may for example represent said information. This approach exploits the fact that the sensor signals of neighboring rows in an image are highly correlated, such that the signals of a preceding row may be taken as a good prediction for the signals of the next row.

The invention further comprises an X-ray examination apparatus with an X-ray tube for generating X-rays and an X-ray detector, wherein the X-ray detector is designed according to the features of a radiation detector of the kind described above. This means that the X-ray detector comprises an array of X-ray sensitive sensor elements, an addressing unit, a read-out arrangement, and a control unit for individually setting preprocessing parameters for sensor signals in the read-out arrangement.

Moreover, the invention comprises a method for generating an image with the help of an array of sensor elements, the method comprising the following steps:

a) Addressing a subgroup of sensor elements, for example a row of sensor elements in a matrix array of sensor elements.

b) Setting preprocessing parameters individually for the signals of all sensor elements from said subgroup, wherein the setting is based on information that does not (directly or indirectly) depend on said signals. Radiation dose to which the sensor elements of the subgroup are exposed is one example for an information that would depend on the signals to be preprocessed and therefore would be no valid information for the setting of preprocessing parameters according to the method.

After the setting of the preprocessing parameters, the signals of all sensor elements from said subgroup are preprocessed according to that parameters and are read out for further processing.

c) Steps a) and b) are repeated until all sensor elements of the array have been read out.

d) An image is composed of all signals that have been preprocessed and read out according to steps a), b), and c).

The method comprises in general form the steps that can be executed with a radiation detector of the kind described above. Therefore, reference is made to the preceding description for more information on the details, advantages and improvements of that method.

These and other aspects of the invention will be apparent from and elucidated with reference to the embodiment(s) described hereinafter.

In the following the invention is described by way of example with the help of the accompanying drawing which shows an X-ray detector according to the present invention.

The only FIGURE schematically represents an X-ray detector 1 which comprises an array 2 of sensor elements 21 (pixels) that are organized in rows i and columns j. The array 2 may for example be a large area solid state detector using amorphous silicon photodiodes or photoconductors, amorphous silicon TFT (thin film transistor) switches, or diode switches for the conversion of light or X-rays into electrical signals (e.g. charges). All sensor elements of one row i are connected to the same address line that can selectively be set to a certain voltage by an addressing unit 5 (or "row driver") if the sensor elements 21 of said row shall be addressed. Moreover, the sensor elements 21 of each column j are connected to the same read-out line which leads to a read-out unit 3 on the lower border of the array 2. As is illustrated for one column j, the read-out unit 3 comprises an amplifier 31 and an analog-to-digital (A/D) converter 32 for each read-out line in order to amplify and digitize sensor signals on said read-out line. The preprocessed and read out sensor signals are then passed on to a data processing device 7—for example a microprocessor with associated memory—for further processing. An image generated from the signals may for example be displayed on a monitor 4.

When an X-ray image shall be generated with the detector 1, an object (for example a patient) is exposed to X-radiation from an X-ray tube (not shown), and the radiation that is transmitted through the object is registered by the X-ray detector 1. In order to read out the image signals from the sensor elements 21 after such an exposure, the addressing unit 5 consecutively addresses the rows of the array 2, and in each step the sensor signals of each row are passed to the read-out unit 3 via the read-out line. Thus the image is read out row by row. More details of this read-out process may be found in the document WO 03/093869 A1 which is incorporated into the present application by reference. The X-ray detector according to said document comprises at least one dosimeter for measuring the dose of X-radiation that reaches a subgroup of pixels, for example a block of 2×2 pixels. The amplification gain for the sensor signals in such a subgroup may then be individually set during the read-out process. In contrast to this, the radiation detector 1 according to the present invention does not comprise a dosimeter or a similar device for measuring the dose in sub-regions of the sensor array 2. The detector 1 comprises however a control unit 6 that is connected both to the addressing unit 5 and the read-out unit 3, and that is adapted to individually set the gains of the amplifiers 31 for each read-out line and for each row of sensor elements 21 which is read out. Therefore, each sensor element 21 of the array 2 may be amplified with a different gain during the read-out process of an image. The control unit 6 preferably also provides the read-out timing by sending appropriate signals to the addressing unit 5. Addressing unit 5 may for example comprise a shift register through which a signal is shifted along the rows of the array 2 according to a clock signal from control unit 6.

In the design described above the gain settings of the column amplifiers 31 may be varied locally and even temporarily during the read-out of one image frame. According to the local control of the preprocessing of sensor signals, the gains per read-out chip (for example 120 channels), the gains per group of columns, or the gains of each individual column j may be varied by the control unit 6. According to the temporal control, the gains may be varied per group of rows or per individual row i.

If the control per individual column j and individual row i are combined, each pixel of an image frame may be read out with a dedicated individual gain setting.

The possibility to select the gains for individual pixels of an image or a subgroup of pixels may be exploited for the improvement of image quality. In order to find the right parameter settings, the control unit 6 is connected to the data processing device 7 in order to exchange information with it. The processing device 7 may particularly comprise a memory in which a priori knowledge of the measured object is stored. This a priori knowledge which describes general and always present features of the object that is imaged may then be exploited in order to find appropriate gain settings for the amplifiers 31. The data processing device 7 moreover comprises a memory in which all gains that were set during a read-out process are stored in order to be able to reconstruct the absolute value of the image signals during the final image processing.

According to an alternative embodiment, the memory of the processing device 7 may comprise one or several previous X-ray images of the object, for example previous X-ray images of a patient. Preferably, these images are taken immediately before the generation of the present image, such that there is only a minimal movement of the object between said images. The previous X-ray image may for example be a preliminary exposure that is taken with a reduced dose. In this case, the previous image indicates image regions with little irradiation, where the gain of the amplifiers 31 can be set to a high value, and image regions with a higher illumination, where the gain of the amplifiers 31 is reduced in order to avoid saturation of the signals. If there would be an exact pixel by pixel correspondence between the previous image and the present image, the gains of the present image could be controlled individually for each pixel. Normally, however, there is a certain mismatch between the previous and the present image, and therefore the gain for a sensor element in the present image will preferably be calculated from a region surrounding said sensor element under consideration in the previous image.

According to a further embodiment, the control unit 6 calculates the gains for the amplifiers 31 from image signals of frames that were already read out. Particularly, the control unit 6 may infer the gains from the sensor signals of the previous row of the same image frame. Because image signals of neighboring sensor elements are highly correlated, the reading of a sensor element in one row is a good prediction for the value of the sensor signal in the following row (and in the same or a neighboring column). Thus the gain of each amplifier 31 for the present sensor signal is determined by the previous sensor signal which was processed by said amplifier 31.

The design described above may be applied with solid-state X-ray or light detectors based on monocrystalline silicon as well as amorphous silicon. Moreover, it may also be applied if amplifiers are present in each sensor element 21 instead of the shown common amplifiers 31 for each column j.

Using the arrangement and methods proposed above, the overall sensitivity range of the detector 1 can be increased beyond the dynamic range limit defined by the analog-digital-converters 32. This is especially interesting for large area X-ray detectors in situations where they are only partially shaded by the measured object. In regions of direct radiation prior art detectors saturate already at low X-ray doses, while quantum noise and limited dynamic range in the shaded areas are not sufficient to resolve low contrast objects.

Finally it is pointed out that in the present application the term "comprising" does not exclude other elements or steps, that "a" or "an" does not exclude a plurality, and that a single processor or other unit may fulfill the functions of several means. Moreover, reference signs in the claims shall not be construed as limiting their scope.

We claim:

1. A radiation detector, comprising:
   an array of sensor elements;
   an addressing unit for selectively addressing subgroups of the sensor elements;
   a read-out arrangement for preprocessing and reading out the signals of sensor elements that have been addressed by the addressing unit;
   a control unit that is connected to the addressing unit and the read-out arrangement, the control unit being adapted to set preprocessing parameters individually for each of the signals of all sensor elements of a subgroup each time a subgroup is addressed by the addressing unit, wherein the determination of the preprocessing parameters is based on information that does not depend on said individual signals.

2. The radiation detector according to claim 1, wherein the read-out arrangement comprises amplifiers for amplifying the signals of the sensor elements wherein the gain of said amplifiers can be set by the control unit individually for each sensor element.

3. The radiation detector according to claim 1, wherein the array consist of rows (i) and columns (j) of sensor elements, wherein the rows (i) constitute the subgroups that can be addressed by the addressing unit, and wherein all sensor elements of a column (j) are connected via the same line to the read-out arrangement.

4. The radiation detector according to claim 1, further comprising a memory containing information that is related to the image which is currently generated by the radiation detector, and that the control unit is adapted to make use of said information for the determination of the preprocessing parameters.

5. The radiation detector according to claim 1, wherein the information comprises a priori knowledge of an object that is currently being imaged.

6. The radiation detector according to claim 1, wherein the information comprises a previous image of an object that is currently imaged.

7. The radiation detector according to claim 1, wherein the information is based on signals of the currently generated image from sensor elements that have already been read out.

8. The radiation detector according to claim 1, wherein the sensor elements comprise amorphous or monocrystalline silicon.

9. The radiation detector of claim 1, wherein the information is based on a preliminary x-ray image taken in temporal proximity to a current x-ray image, wherein the preprocessing parameters of the current x-ray image comprise a gain for each of the sensor elements, and wherein the gain is adjusted for each of the sensor elements based on illumination of a region of the preliminary x-ray image that is in proximity to a region of the current x-ray image associated with each of the sensor elements.

10. The radiation detector of claim 9, wherein the gain is adjusted for each sensor element for the current x-ray image based on a plurality of points on the preliminary x-ray image that surround the point on the current x-ray image associated with the sensor element.

11. The radiation detector of claim 1, wherein the preprocessing parameters comprise a gain for each of the sensor elements, and wherein the information comprises a level of illumination for one or more sensor elements adjacent to an individual sensor element that has a gain being adjusted.

12. An X-ray examination apparatus with an X-ray tube and an X-ray detector, comprising:

an array of sensor elements;

an addressing unit for selectively addressing subgroups of the sensor elements;

a read-out arrangement for preprocessing and reading out the signals of sensor elements that have been addressed by the addressing unit;

a control unit that is connected to the addressing unit and the read-out arrangement, the control unit being adapted to gain individually for the signals of all sensor elements of a subgroup each time a subgroup is addressed by the addressing unit, wherein the determination of the gain is based on information that does not depend on said signals.

13. The apparatus of claim 12, wherein the information is based on a level of illumination for regions of a preliminary x-ray image taken in temporal proximity to a current x-ray image, and wherein each of the regions of the preliminary x-ray image correspond with a region of the current x-ray image associated with each of the sensor elements.

14. The apparatus of claim 13, wherein the gain is adjusted for each sensor element for the current x-ray image based on a plurality of points on the preliminary x-ray image that surround the point on the current x-ray image associated with the sensor element.

15. The apparatus of claim 12, wherein the information comprises a level of illumination for one or more sensor elements adjacent to an individual sensor element that has a gain being adjusted.

16. A method for generating an image with an array of sensor elements, the method comprising the steps of;

a) addressing a subgroup (i) of sensor elements;

b) setting a gain individually for the signals of all sensor elements of said subgroup based on information that does not depend on said signals, and then preprocessing and reading out said signals;

c) repeating steps a) and b) until all sensor elements of the array have been read out;

d) composing an image from all preprocessed and read out signals.

17. The method of claim 16, further comprising:

obtaining a preliminary x-ray image in temporal proximity to a current x-ray image, wherein the preliminary x-ray image is of a smaller exposure dosage than the current x-ray image; and determining the information based on a level of illumination for regions of the preliminary x-ray image, wherein each of the regions of the preliminary x-ray image correspond with a region of the current x-ray image associated with each of the sensor elements.

18. The method of claim 17, comprising adjusting the gain for each sensor element for the current x-ray image based on a plurality of points on the preliminary x-ray image that surround the point on the current x-ray image associated with the sensor element.

19. The method of claim 16, comprising determining the information based on a level of illumination for one or more sensor elements adjacent to an individual sensor element that has a gain being adjusted.

* * * * *